US012023820B2

(12) United States Patent
Morra

(10) Patent No.: US 12,023,820 B2
(45) Date of Patent: Jul. 2, 2024

(54) HAIR CUTTING DEVICE

(71) Applicant: Salvatore Morra, Pietrasanta (IT)

(72) Inventor: Salvatore Morra, Pietrasanta (IT)

(*) Notice: Subject to any disclaimer, the term of this patent is extended or adjusted under 35 U.S.C. 154(b) by 0 days.

(21) Appl. No.: 17/252,880

(22) PCT Filed: May 27, 2019

(86) PCT No.: PCT/IB2019/054375
§ 371 (c)(1),
(2) Date: Dec. 16, 2020

(87) PCT Pub. No.: WO2019/243924
PCT Pub. Date: Dec. 26, 2019

(65) Prior Publication Data
US 2021/0154869 A1 May 27, 2021

(30) Foreign Application Priority Data
Jun. 18, 2018 (IT) ........................ 202018000002787

(51) Int. Cl.
*B26B 19/20* (2006.01)

(52) U.S. Cl.
CPC .................................... *B26B 19/20* (2013.01)

(58) Field of Classification Search
CPC .............................. B26B 19/20; B26B 19/205
See application file for complete search history.

(56) References Cited

U.S. PATENT DOCUMENTS 1,331,218 A * 2/1920 Severson ................ B26B 19/20 30/201
1,723,828 A * 8/1929 Von Sandt .............. B26B 19/44 15/301
1,730,004 A * 10/1929 Gregson ................. B26B 19/44 30/43.2
2,785,461 A * 3/1957 Lalla, Sr. ................ B26B 19/16 30/34.2
2,972,351 A * 2/1961 Morgan .................. B26B 19/00 30/202
3,233,614 A * 2/1966 Lefcoski ................. B26B 19/02 132/213
3,260,268 A * 7/1966 Reynolds ................ B26B 19/00 30/133
3,396,462 A * 8/1968 Dufresne ............ B26B 19/3853 30/41.5
3,413,985 A * 12/1968 Dlouhy ................... B26B 19/00 83/72
3,570,500 A * 3/1971 Berry ...................... B26B 19/00 132/213

(Continued)

OTHER PUBLICATIONS

International Search Report and Written Opinion, mailed Aug. 26, 2019.

*Primary Examiner* — Richard D Crosby, Jr.
(74) *Attorney, Agent, or Firm* — Vorys, Sater, Seymour and Pease LLP

(57) ABSTRACT

A hair cutting device is provided including a helmet suitable to be placed on the head and defining an inner surface facing the hair when the helmet is worn and counter-shaped to the head; the helmet includes channels each defining an inlet section for the hair in the channels and a main extension axis radial with respect to the inner surface; and a hair cutter in the channels defining a cutting direction perpendicular to the main extension axis.

14 Claims, 2 Drawing Sheets

(56) References Cited

U.S. PATENT DOCUMENTS

| | | | | | |
|---|---|---|---|---|---|
| 3,654,699 | A * | 4/1972 | Garcia | B26B 19/44 | 30/133 |
| 3,678,944 | A * | 7/1972 | Berry | B26B 19/00 | 132/213.1 |
| 4,210,162 | A * | 7/1980 | Dreyer | A45D 20/04 | 132/271 |
| 4,314,405 | A * | 2/1982 | Park | B26B 19/38 | 132/214 |
| 4,602,542 | A * | 7/1986 | Natrasevschi | B26B 21/4081 | 132/214 |
| 4,679,322 | A * | 7/1987 | Hunts | B26B 19/44 | 30/220 |
| 4,868,984 | A * | 9/1989 | Elsherbini | B26B 19/44 | 30/41.5 |
| 4,970,788 | A * | 11/1990 | Hunts | B26B 19/44 | 30/233 |
| 5,031,320 | A * | 7/1991 | Persyn | B26B 19/44 | 30/133 |
| 5,142,786 | A * | 9/1992 | Hunts | B26B 19/44 | 30/201 |
| 5,231,762 | A * | 8/1993 | Hunts | A01K 13/002 | 30/132 |
| 5,377,411 | A * | 1/1995 | Andriotis | B26B 19/44 | 30/253 |
| 5,865,192 | A * | 2/1999 | Sealy | B26B 29/06 | 132/214 |
| 8,474,466 | B2 * | 7/2013 | Lakin | B26B 19/00 | 83/13 |
| 8,484,853 | B1 * | 7/2013 | Laube | B26B 19/44 | 30/216 |
| 8,857,011 | B2 * | 10/2014 | Casper | A47L 9/1409 | 15/396 |
| 9,789,619 | B2 * | 10/2017 | Eljaouhari | B26B 19/388 | |
| 10,279,493 | B2 * | 5/2019 | Snow | B26B 19/3886 | |
| 2015/0224655 | A1 * | 8/2015 | Talavera | B26B 19/22 | 30/179 |

* cited by examiner

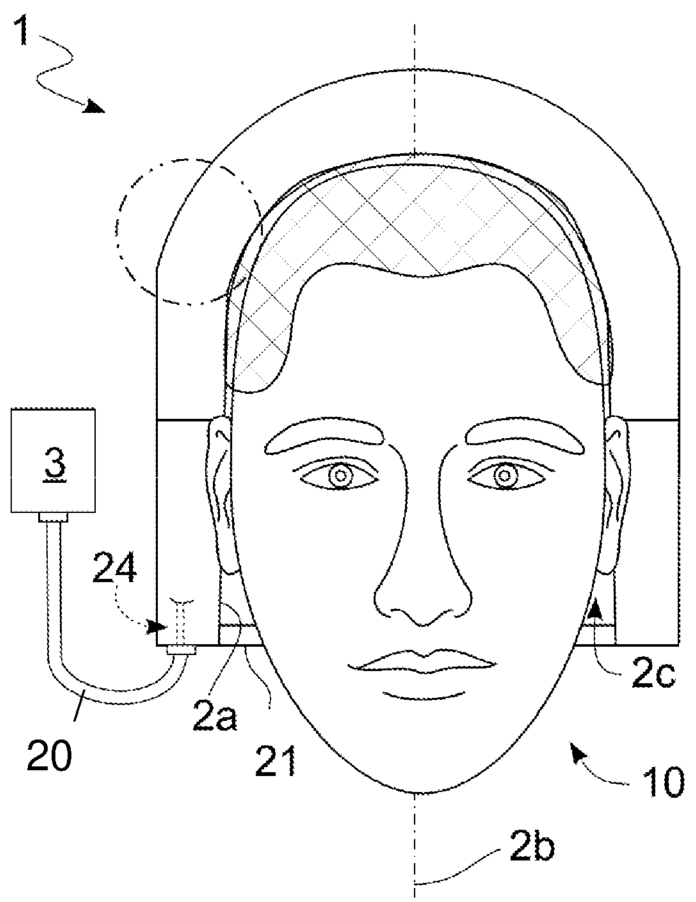
Fig. 1
Fig. 2a
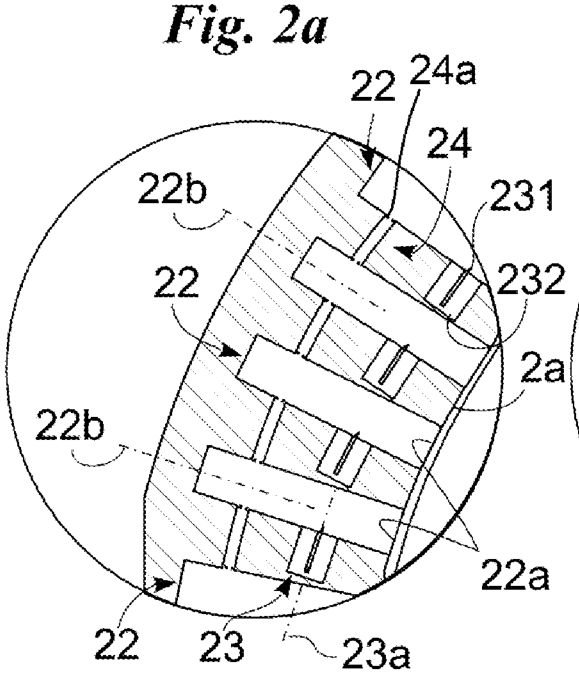
Fig. 2b
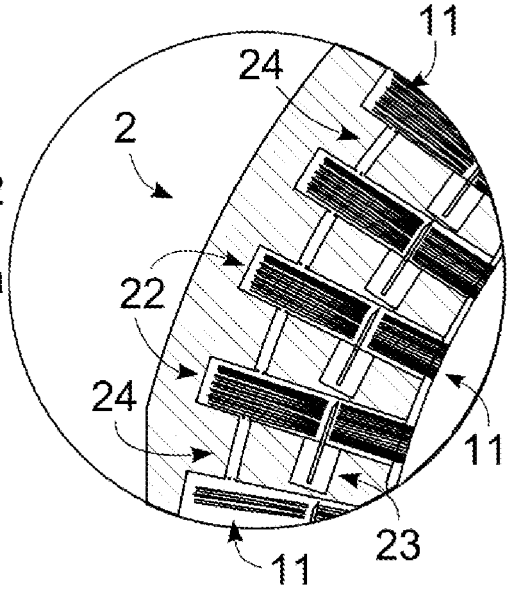

HAIR CUTTING DEVICE

FIELD OF THE INVENTION

The present invention relates to a device for cutting hair.

BACKGROUND OF THE INVENTION

As known, hair is cut with the combined use of combs and blades\razors or scissors. The blades sector is particularly varied in terms of the shape in which they are made. In fact, the blades may be made similar to a chisel, or with a dual cutting surface. Blades are also known of with shaped cutting wire, typically convex or mixtilinear, for particular purposes.

Scissors, as known, consist of two reciprocally hinged elements having on one side the hand grip, preferably between thumb, index and middle finger, and on the other hand two blades defining a V-profile with variable aperture depending on the action of the hairdresser on the grip.

The prior art described has several significant drawbacks.

A first major drawback is that cutting hair is a very difficult operation to perform.

This difficulty is due to the need to precisely operate particularly dangerous instruments such as scissors, razors and blades which could injure the hairdresser or the customer.

This aspect may be accentuated by the type of cut to be performed which may require unnatural poses or complex movements.

These drawbacks result in a poor quality cut that often tends not to maintain the desired shape even with limited hair regrowth.

In addition, improper cutting can lead to hair damage and consequently to an increase in hair loss and similar problems.

In this situation the technical purpose of the present invention is to devise a hair cutting device able to substantially overcome at least some of the drawbacks mentioned.

SUMMARY OF THE INVENTION

As part of this technical task, one important purpose is to obtain a device which allows a high quality, durable and above all non-damaging haircut to be performed. The technical purpose and specified aims are achieved by a hair cutting device as claimed. Examples of preferred embodiments are also described in the claims.

BRIEF DESCRIPTION OF THE DRAWINGS

The characteristics and advantages of the invention are clearly evident from the following detailed description of preferred embodiments thereof, with reference to the accompanying drawings, in which:

FIG. 1 shows the hair cutting device according to the invention when worn;

FIG. 2*a* highlights a detail of the hair cutting device; and FIG. 2*b* shows the detail of FIG. 2*a* in use.

DETAILED DESCRIPTION

Figure 3:
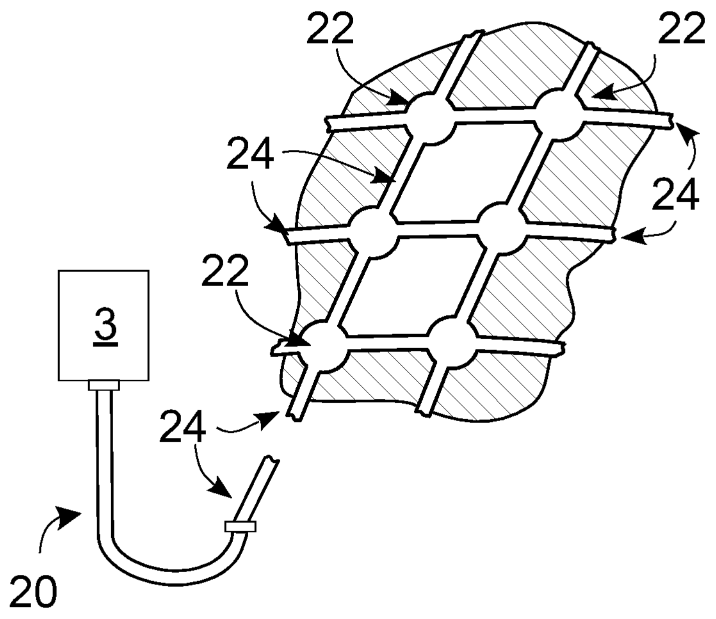
FIG. 3 shows the suction means in fluid through connection with channels of the helmet of the hair cutting device.

Herein the measures, values, shapes and geometric references (such as perpendicularity and parallelism), when used with words like "about" or other similar terms such as "approximately" or "substantially", are to be understood as except for measurement errors or inaccuracies due to production and/or manufacturing errors and, above all, except for a slight divergence from the value, measure, shape or geometric reference which it is associated with. For example, said terms, if associated with a value, preferably indicate a divergence of not more than 10% of said value.

In addition, where used terms such as "first", "second", "upper", "lower", "main" and "secondary" do not necessarily refer to an order, a priority relationship or relative position, but may simply be used to more clearly distinguish different components from each other.

The measurements and data presented herein are to be considered, unless otherwise indicated, as made in Standard International Atmospheres ICAO (ISO 2533).

Unless otherwise specified, as is apparent from the following discussions, it is considered that terms such as "computer science", "determination", "calculation" or similar, refer to the computer action and/or processes or similar electronic computing devices that manipulate and/or transform data represented as physical, such as electronic quantities of registers of an information system and/or memory, other data similarly represented as physical quantities within computer systems, registers or other devices for storing, transmitting or displaying information.

With reference to the Drawings, reference numeral 1 globally denotes the hair cutting device according to the invention.

The haircutting device 1 comprises a helmet 2 suitable to be placed on the head 10 of the person whose hair 11 is to be cut.

The helmet can be entire, partial or other element suitable to accommodate long or short hair.

When worn, the helmet 2 defines an inner surface 2*a* facing the hair 11 and therefore the head 10.

The inner surface 2*a* is substantially counter-shaped to at least part of the head 10 and in particular to the portion of the head 10 with hair 11.

The helmet 2 defines a longitudinal axis 2*b* suitable to place itself substantially parallel to the longitudinal axis of the head 10 when the helmet 2 is worn.

Suitably, the inner surface 2*a* is suitable to be positioned close to the head 10 but not in contact with it. When worn, the helmet 2 defines a working volume 2*c* in which hair 11 is present.

When worn, the working volume 2*c* is delimited between the inner surface 2*a* and the head 10 and preferably is substantially airtight. To this end, the helmet 2 may comprise closing means 21 suitable to come into contact with the head 10 realizing said airtight closure of said volume.

The closing means 21 may comprise a rubber profile extending along the perimeter of the suitably soft inner surface 2*a* so as to deform when in contact with the head 10 and adhere perfectly thereto.

The helmet 2 comprises channels 22 each defining an inlet section 22*a* for the hair 11 in said channels 22.

Each inlet section 22*a* identifies an area of the inner surface 2*a*.

The channels 22 may be blind holes having as their only opening the inlet section 22*a* (FIGS. 2*a* and 2*b*).

Alternatively, the channels 22 may be through holes in the helmet 2. In this case each channel 22 defines, in addition to an inlet section 22*a*, an outlet section opposite said inlet section 22*a* with respect to the channel 22; the helmet 2 may comprise suitably hermetic closure caps of the outlet section.

The channels 22 define a main extension axis 22*b* substantially radial with respect to the inner surface and therefore to the head 10. The inlet section 22*a* and, if present, the outlet section are substantially perpendicular to the main extension axis 22*b*.

Advantageously, the main extension axes 22*b* are almost radial to the inner surface 2*a*. They are therefore almost perpendicular to the tangent of the inner surface 2*a* appropriately calculated at the centre of gravity of the inlet section 22*a*.

The helmet 2 comprises, for each channel 22, cutting means 23 of the hair 11 in the channels 22 defining a cutting direction 23*a* substantially perpendicular to the main extension axis 22*b*.

The cutting means 23 comprise a blade 231 and a movement element 232 of the blade 231 at least along the cutting direction 23*a*.

The channel 22 may comprise an opening in which the blade 231, moved by the movement element 232, slides, varying the blade portion 231 superposing the channel.

The movement element 232 is suitable to move the blade 231 along the cutting axis 23*a* defining a retracted position (FIG. 2*a*) wherein the blade 231 is almost entirely outside the channel 22; and a working position (FIG. 2*b*) wherein the blade 231 protrudes into the channel 22 suitably almost in contact with the channel 22 on the side opposite said opening.

The movement element 232 may additionally be suitable to move the blade 231 along a sliding direction substantially parallel to the main extension axis 22*b* so as to vary the distance of said blade from the inlet section 22*a* and thus modify the cutting length of the hair 11.

It should be noted that the moving elements 232 can all define the same cutting length and/or define at least partially distinct cutting lengths.

The movement element 232 may be electric.

The hair cutting device 1 comprises suction means 3 suitable to depress the channels 22 making the hair 11 enter said channels; and the helmet 2 comprises ducts 24 suitable to place the suction means 3 in fluid through connection with the channels 22 as, for example, shown in FIG. 3.

Preferably, the ducts 24 interconnect the channels 22 as, for example, shown in FIG. 3, so that all the channels 22 always have the same pressure.

The suction means 3 can be integrated into the helmet 2. Alternatively, they may be external to the helmet and thus have a connection pipe 20 to at least one duct 24 as for example, shown in FIG. 1.

The suction means 3 are suitable to aspirate air from the channels 22 outwards so as to place the channels 22 and therefore the aforementioned working volume 2*c* between the inner surface 2*a* and the head 10 in depression, i.e. at a pressure lower than that of the environment. In addition, the suction means 3 are suitable to aspirate air from the outside towards the channels 22 placing the channels 22 and therefore the working volume 2*c* between the inner surface 2*a* and the head 10 in overpressure, i.e. at a higher pressure than that of the environment.

Each duct 24 may comprise filtration means 24*a* suitable to prevent the entry of said hair in said ducts.

The hair cutting device 1 may comprise suitably electrical power supply means of the device itself. The power supply means may comprise a battery and/or means of connection to an external grid.

The hair cutting device 1 may comprise a control board for the operation of the hair cutting device 1 and in particular the cutting means 23 and suitably suction means 3.

The hair cutting device 1 may comprise an interface, suitably input and/or output, suitable to allow an operator to control the operation of the hair cutting device 1.

The functioning of the hair cutting device 1 described above in structural terms, is as follows.

Initially the channels 22 are at a pressure substantially equal to that of the environment and the blades 231 are in the retracted position (FIG. 2*a*).

First the hairdresser puts the helmet 2 (FIG. 1) on the head of the person whose hair is to be cut 11 and brings the closing means 21 into contact with the head 10 producing an airtight closure of the working volume 2*c*.

At this point and appropriately through the interface, the hairdresser controls the activation of the suction means 3 which control the entry of the hair 11 into said channels by depressing the channels 22.

It should be noted that, since the main extension axis 22*b* is substantially radial to the inner surface and therefore to the head 10, the hair 11 is arranged radially to the head 10.

At this point, the movement element 232 moves the blades 231 to the working position which thus perform the haircut (FIG. 2*b*).

It should be noted that the hairdresser, by means of the movement element 232, can vary the length of the cut as needed according to the customer's requests.

In particular, he may command a sequence of cuts, such as two or three, made with a different position of the blade 231 along the main extension axis 22*b*.

After cutting the hair 11, the movement element 232 places the blades 231 in the retracted position while the suction means 3 restore the working volume 2*c* to a pressure at least equal to that of the environment allowing the hairdresser to easily remove the helmet 2.

After removing the helmet 2, the suction means 3 can lead to overpressure in the channels 22 to expel the hair 11 from the channels 22 and thus clean the helmet 2.

The hair cutting device 1 according to the invention achieves important advantages. In fact, the device 1, by arranging the hair 11 radially to the inner surface 2*a* and thus to the head 10, performs a tangential cut to the scalp that ensures a set\final result of improved aesthetic quality and increased duration.

The cut is therefore more elegant, of higher quality and does not stress or strain the hair 11 which is thus healthier and less prone to falling out.

It also does not require gels, foams or other fixing agents.

Variations may be made to the invention described herein without departing from the scope of the inventive concept defined in the claims. In said sphere all the details may be replaced with equivalent elements and the materials, shapes and dimensions may be as desired.

The invention claimed is:

1. A hair cutting device comprising:

a suction means; and a helmet suitable to be placed on the head and defining an inner surface facing said hair when said helmet is worn and said inner surface suitable to face the head while not contacting the head to define a working volume between the inner surface and the head when said helmet is worn;

wherein said inner surface is counter-shaped to at least part of said head with said hair;

wherein said helmet comprises closing means comprising a profile extending along a perimeter of the inner surface to deform when in contact with the head;

wherein said helmet comprises:

channels each of which defines an inlet section for said hair in said channels, in fluid through communication with the working volume, and a main extension axis substantially radial with respect to said inner surface; and for each channel cutting means of said hair in said channels defining a cutting direction substantially perpendicular to said main extension axis; and wherein said helmet comprises a first duct, and a plurality of ducts in fluid through communication with said channels, wherein the first duct is connected in fluid through communication to the suction means that is suitable to aspirate air from said channels and the working volume outwards from the helmet to place the channels and the working volume at a pressure lower than that of an environment surrounding the helmet and then to have said channels at pressure lower than that of the environment surrounding the helmet making said hair enter said channels when said blade is in said retracted position while said hair is arranged radially to the head; and the plurality of ducts each extending between a respective pair of adjacent said channels to put said respective pair of adjacent said channels in fluid through communication;

the first duct and the plurality of ducts are suitable to place said suction means in reciprocal fluid through connection with said channels and to interconnect said channels so that all said channels are in fluid through communication;

wherein said cutting means comprise a blade and a movement element of said blade along said cutting direction;

wherein the channel comprises an opening in which the blade, moved by the element, slides, varying portion of the blade superposing the channel; and wherein said movement element is suitable to reciprocally move said blade along the cutting direction defining:

a retracted position wherein the blade is almost entirely outside the channel, and a working position wherein the blade protrudes into the channel from the opening suitably almost in contact with the channel on the side opposite said opening performing the haircut, and then back to the retracted position.

2. The hair cutting device according to claim 1, wherein the first duct and the plurality of ducts comprise filter means suitable to prevent the entry of said hair into the first duct and the plurality of ducts.

3. The hair cutting device according to claim 1, wherein the movement element is adapted and configured to place the blades in said working position to perform a haircut and to place the blades in said retracted position after the haircut while the suction means restores the pressure to at least equal to that of environment surrounding the helmet for allowing removal of the helmet, and wherein the suction means are adapted and configured to aspirate air from the outside towards said channels and then to lead to overpressure in the channels after removing the helmet from the head after cutting hair to expel the hair from the channels and thus clean the helmet.

4. The hair cutting device according to claim 1, wherein each channel has opposed open and closed ends located along the main extension axis and sidewalls between the open end and closed end, the open end located at the inlet section to be facing said hair when said helmet is worn and admit the hair, wherein the open end of the inlet section is substantially perpendicular to the main extension;

the closed end located to be facing away from said hair when said helmet is worn;

wherein the channel open end is flush with the inner surface of the helmet;

wherein for every blade of the hair cutting device:

the channel sidewalls comprise the opening in which the blade, moved by the movement element, slides therethrough along the cutting direction substantially perpendicular to said main extension axis, varying the portion of the blade superposing the channel, and said movement element is suitable to reciprocally move said blade along the cutting direction substantially perpendicular to said main extension axis defining:

the retracted position wherein the blade is almost entirely outside the channel, and the working position wherein the blade protrudes into the channel suitably almost in contact with the channel sidewall on the side opposite said opening performing the haircut.

5. The hair cutting device according to claim 1, wherein said helmet closing means profile extends along the perimeter of the inner surface to deform when in contact with the head to make the working volume substantially airtight when the helmet is worn.

6. The hair cutting device according to claim 5, wherein the opening of the channel, for the blade to slide therethrough, is more proximal to the open end than a respective duct of the plurality of ducts connecting said channel with the adjacent channel.

7. The hair cutting device according to claim 1, wherein each channel has opposed open and closed ends located along the main extension axis and sidewalls between the open end and closed end, the open end located at the inlet section to be facing said hair when said helmet is worn and admit the hair, wherein the open end of the inlet section is substantially perpendicular to the main extension;

the closed end located to be facing away from said hair when said helmet is worn.

8. The hair cutting device according to claim 7, wherein the opening of the channel, for the blade to slide therethrough, is more proximal to the open end than a respective duct of the plurality of ducts connecting said channel with the adjacent channel.

9. The hair cutting device according to claim 1, wherein the channel open end is flush with the inner surface of the helmet.

10. The hair cutting device according to claim 9, wherein the opening of the channel, for the blade to slide therethrough, is more proximal to the open end than a respective duct of the plurality of ducts connecting said channel with the adjacent channel.

11. The hair cutting device according to claim 1, wherein for every blade of the hair cutting device:

the channel sidewalls comprise the opening in which the blade, moved by the movement element, slides along the cutting direction substantially perpendicular to said main extension axis, varying the portion of the blade superposing the channel, wherein the blade slides through the opening in the sidewall of the channel; and said movement element is suitable to move said blade along the cutting direction substantially perpendicular to said main extension axis defining:

the retracted position wherein the blade is almost entirely outside the channel, and the working position wherein the blade protrudes into the channel suitably almost in contact with the channel sidewall on the side opposite said opening performing the haircut.

12. The hair cutting device according to claim 1, wherein said suction means are suitable to aspirate air from outside of the helmet to said channels and the working volume to restore the working volume to pressure at least equal to that of environment surrounding the helmet for allowing removal of the helmet after cutting the hair when the blades are retracted.

13. The hair cutting device according to claim 1, wherein the first duct and the plurality of ducts have a filter to prevent entry of hair into the first duct and the plurality of ducts.

14. The hair cutting device according to claim 1, wherein the suction means are external to the helmet and the suction means comprise a connection pipe in fluid through communication to the first duct to aspirate air from said channels and the working volume outwards from the helmet through the connection pipe.

* * * * *